(12) United States Patent
Zhang et al.

(10) Patent No.: US 10,663,429 B2
(45) Date of Patent: May 26, 2020

(54) DEVICE FOR COLLECTING SEMI-VOLATILE OR NON-VOLATILE SUBSTRATE

(71) Applicants: Nuctech Company Limited, Beijing (CN); TSINGHUA UNIVERSITY, Beijing (CN)

(72) Inventors: Qingjun Zhang, Beijing (CN); Yuanjing Li, Beijing (CN); Zhiqiang Chen, Beijing (CN); Ziran Zhao, Beijing (CN); Yinong Liu, Beijing (CN); Yaohong Liu, Beijing (CN); Ge Li, Beijing (CN); Jingli Xie, Beijing (CN); Qiufeng Ma, Beijing (CN); Biao Cao, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 16/235,340

(22) Filed: Dec. 28, 2018

(65) Prior Publication Data

US 2019/0204271 A1 Jul. 4, 2019

(30) Foreign Application Priority Data

Dec. 29, 2017 (CN) .......................... 2017 1 1473459

(51) Int. Cl.
*H01J 49/00* (2006.01)
*G01N 27/62* (2006.01)
*G01N 1/22* (2006.01)
*G01N 1/24* (2006.01)

(52) U.S. Cl.
CPC ......... *G01N 27/622* (2013.01); *G01N 1/2205* (2013.01); *G01N 1/2211* (2013.01); *G01N 1/24* (2013.01); *G01N 2001/244* (2013.01)

(58) Field of Classification Search
CPC ........ G01N 27/622; H01J 49/00; H01J 49/02; H01J 49/0409; H01J 49/0459;
(Continued)

(56) References Cited

U.S. PATENT DOCUMENTS

2009/0050801 A1* 2/2009 Fedorov ................ H01J 49/066
250/288
2014/0116256 A1 5/2014 Yamasaki et al.
(Continued)

FOREIGN PATENT DOCUMENTS

CN 105590827 A 5/2016
CN 108061669 A 5/2018
(Continued)

OTHER PUBLICATIONS

British Examination Report dated Jun. 20, 2019 received in British Application No. 1821245.6.
(Continued)

*Primary Examiner* — Jason L McCormack
(74) *Attorney, Agent, or Firm* — Scully Scott Murphy & Presser

(57) ABSTRACT

The present disclosure provides a device for collecting semi-volatile or non-volatile substance, including an air nozzle, a front cavity and a collecting body. The air nozzle is configured to eject air to a sample attachment surface. The front cavity has an upper port. The collecting body is sealingly connected to a lower end of the front cavity, inside of which is provided with a cylindrical cavity and a conical cavity arranged vertically coaxially, and bottom of which is provided with a sample outlet. The collecting body is provided with an air intake passage which is non-coplanar with respect to an axis of the cylindrical cavity and is disposed obliquely downward and inward. The collecting body is further provided with an air exhaust passage one end of which is a discharge port connected to the interior of the cylindrical cavity, the other end is connected to an air pump.

18 Claims, 4 Drawing Sheets

(58) Field of Classification Search
CPC ...... H01J 49/0463; H01J 49/14; H01J 49/142;
                      H01J 49/145; H01J 49/16
USPC ........................................ 250/281, 282, 288
See application file for complete search history.

(56) References Cited

U.S. PATENT DOCUMENTS

| | | | |
|---|---|---|---|
| 2014/0151543 A1* | 6/2014 | Nagano ................ | G01N 1/2214 250/282 |
| 2017/0016856 A1* | 1/2017 | Zhang ................. | H01J 49/0468 |
| 2017/0102296 A1* | 4/2017 | Sugaya ............... | G01N 1/2202 |
| 2017/0138902 A1* | 5/2017 | Zhang ..................... | G01N 1/22 |
| 2019/0204271 A1 | 7/2019 | Zhang et al. | |

FOREIGN PATENT DOCUMENTS

| | | |
|---|---|---|
| CN | 207816615 U | 9/2018 |
| JP | 2006-314917 A | 11/2006 |
| JP | 2013-083472 A | 5/2013 |
| WO | 2012/063796 A1 | 5/2012 |
| WO | 2015/145546 A1 | 10/2015 |
| WO | 2015/182333 A1 | 12/2015 |
| WO | 2018/220896 A1 | 12/2018 |

OTHER PUBLICATIONS

Canadian Office Action dated Dec. 12, 2019 received from the Canadian Patent Office in application CA 3,028,167.

* cited by examiner

DEVICE FOR COLLECTING SEMI-VOLATILE OR NON-VOLATILE SUBSTRATE

CROSS REFERENCE

This application is based upon and claims priority to Chinese Patent Application No. 201711473459.3, filed on Dec. 29, 2017, the entire contents thereof are incorporated herein by reference.

TECHNICAL FIELD

The present disclosure belongs to the technical field of safety detection, and relates to a device for collecting semi-volatile or non-volatile substance.

BACKGROUND

Recently, ion mobility spectrometer (IMS) technology has been rapidly developed, embodying unique advantages such as detection speed, sensitivity, miniaturization and portable. Instruments based on IMS technology will be an important development direction of future security detection technology. IMS technology is used for on-line detection, and a sample firstly passes through a sampling device. The quality of the sampling device and method not only affects the application scope of the IMS, but affects the sensitivity of the response to the substance to be tested. Therefore, a high-efficient sampling device is one of key technologies that determine the IMS performance.

Chinese Patent CN 105590827B discloses a sample introduction device for particulate matters, wherein an enrichment film is sleeved on a metal conduit, by means of heating and cooling the metal conduit, the enrichment sampling is carried according to the principle of low temperature enrichment and high temperature thermal analysis, and the analysis and detection in the quasi-online mode is realized. Since the cooling process after heating is time-consuming, it is difficult to complete a rapid temperature rise/fall process within 3 minutes, and it is not suitable for on-site rapid detection in the field of safety detection.

The above information disclosed in this background section is only intended to enhance understanding of the background of the present disclosure, and thus may include information that does not constitute the related art known to those of ordinary skill in the art.

SUMMARY

According to one aspect of the present disclosure, there is provided a device for collecting semi-volatile or non-volatile substance including an air nozzle, a front cavity and a collecting body; the air nozzle is configured to eject air to a sample attachment surface to generate an airflow entrained with sample particles; an upper end of the front cavity has an upper port through which the airflow enters into the front cavity; the collecting body is sealingly connected to a lower end of the front cavity, inside of which is provided with a cylindrical cavity and a conical cavity arranged coaxially in the vertically direction, and bottom of which is provided with a sample outlet for discharging a sample particle; the sample outlet is connected to the bottom of the conical cavity; the collecting body is provided with air intake passage for allowing the airflow to enter the cylindrical cavity from the front cavity, which is non-coplanar with respect to the axis of the cylindrical cavity, and is disposed obliquely downward and inward, so that the airflow forms a cyclone that rotates downwards within the cylindrical cavity; the collecting body is further provided with an air exhaust passage, one end of which is a discharge port, and the other end is connected to an air pump, and the discharge port is connected to the interior of the cylindrical cavity.

According to an embodiment of the present disclosure, an axis of the cylindrical cavity and the conical cavity is a vertical axis.

According to an embodiment of the present disclosure, the axis is perpendicular to the sample attachment surface.

According to an embodiment of the present disclosure, the conical cavity is a tapered cavity having a large end communicating with the cylindrical cavity and a small end communicating with the sample outlet; the cyclone is folded back upward and then discharged from the discharge port of the air exhaust passage after the cyclone is separated from the sample particles in the conical cavity.

According to an embodiment of the present disclosure, the discharge port of the air exhaust passage extends downwards from a top of the cylindrical cavity into the cylindrical cavity.

According to an embodiment of the present disclosure, the air intake passages are provided in plurality, and the plurality of air intake passages are uniformly arranged in a clockwise direction or a counterclockwise direction.

According to an embodiment of the present disclosure, the number of the intake passage is 2 to 10.

According to an embodiment of the present disclosure, the airflow ejected by the air nozzle is an impulse type airflow.

According to an embodiment of the present disclosure, the front cavity is a flared structure, the lower end has a lower port, and the diameter of the upper port is larger than the diameter of the lower port.

According to an embodiment of the present disclosure, the front cavity is made of an inert metal or glass material.

According to an embodiment of the present disclosure, a diameter of the sample outlet is 1-1.2 times a diameter of the discharge port.

According to an embodiment of the present disclosure, a gas flow rate in the air exhaust passage is not less than 10 times the gas flow rate at the sample outlet.

According to an embodiment of the present disclosure, a filter device for allowing sample particles to pass therethrough and for filtering large particle impurities is connected below the sample outlet.

According to an embodiment of the present disclosure, the air nozzle is of a narrow slit type.

BRIEF DESCRIPTION OF THE DRAWINGS

The above and other features and advantages of the present disclosure will become more apparent from the detailed description of the exemplary embodiments with reference to the accompanying drawings.

DETAILED DESCRIPTION

Figure 1:
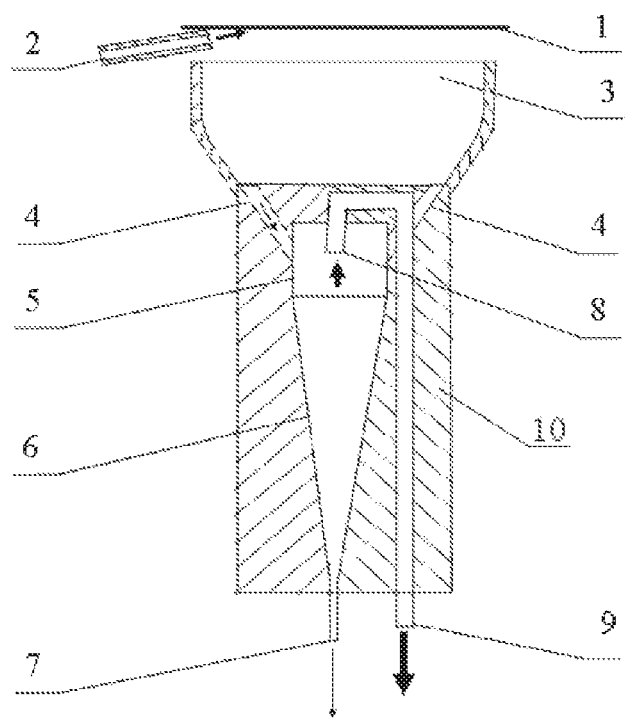
FIG. 1 is a schematic view of a device for collecting semi-volatile or non-volatile substance according to an embodiment of the present disclosure.

Example embodiments will now be described more fully with reference to the accompanying drawings. However, the example embodiments can be embodied in a variety of forms, and should not be construed as being limited to the embodiments set forth herein; rather, these embodiments are provided so that this disclosure will be thorough and complete, and the concepts of the example embodiments will be fully given to those skilled in the art. The same reference numerals in the drawings denote the same or similar structures, and thus their detailed descriptions will be omitted.

Figure 2:
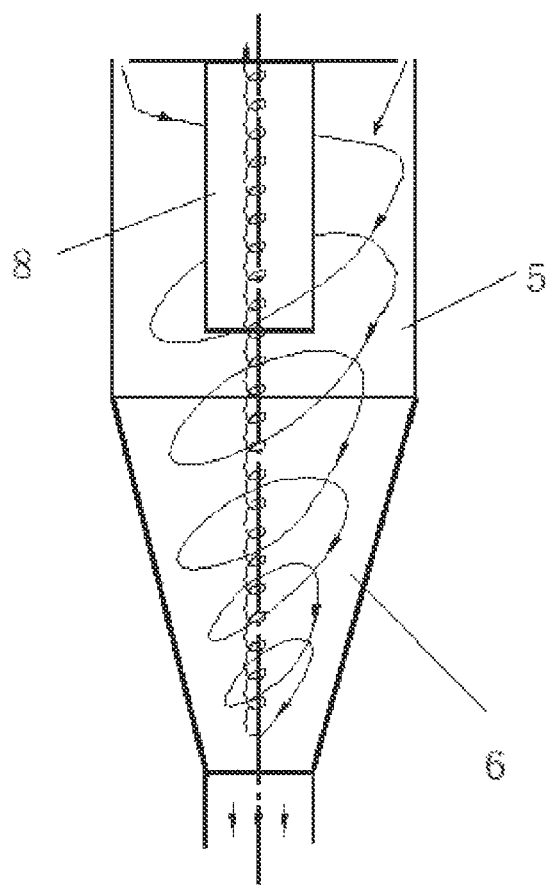
FIG. 2 is a schematic view for showing the direction of the airflow in FIG. 1.

Referring to FIG. 1 and FIG. 2, an embodiment of the present disclosure discloses a device for collecting semi-volatile or non-volatile substance which is used for collecting samples on a surface of a sample attachment surface 1 for analysis and testing by subsequent analytical instrument, and is suitable for on-site rapid sampling analysis with an ion mobility spectrometer (IMS), a gas chromatography-ion mobility spectrometer (GC-IMS), a gas phase chromatography (GC), a mass spectrometry (MS), and a gas chromatography-mass spectrometry (GC-MS) and the like.

Figure 4A:
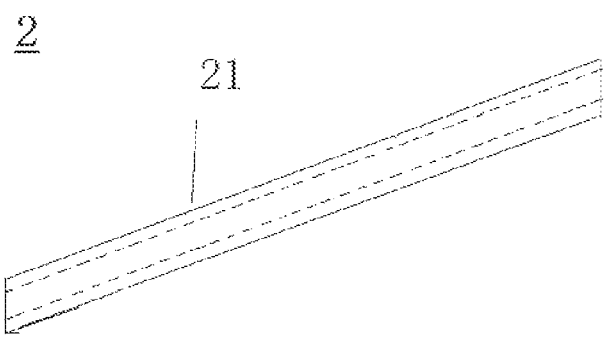
FIG. 4a is a front view of the air nozzle.
Figure 4B:
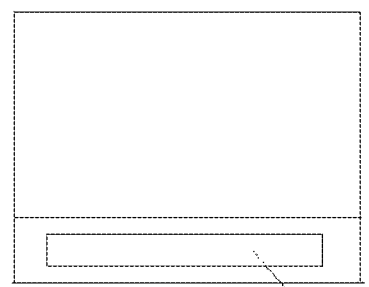
FIG. 4b is a left side view of the air nozzle.
Figure 4C:
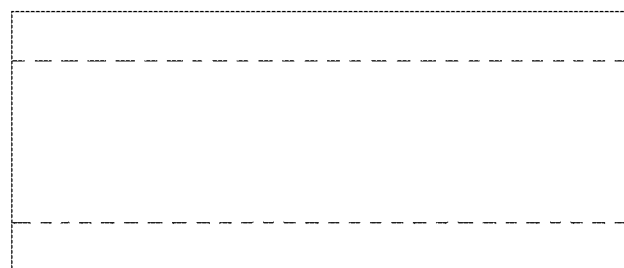
FIG. 4c is a top view of the air nozzle.

The device includes an air nozzle 2, a front cavity 3 and a collecting body 10; the air nozzle 2 is used for ejecting a high-speed airflow to the sample attachment surface 1 to be detected, so that sample particles are blew from the sample attachment surface 1 to produce an airflow entrained with sample particles. Referring to FIGS. 4a to 4c, the air nozzle 2 may be a narrow slit type, in the embodiment, the narrow slit type air nozzle 2 includes a body 21 which is a hollow rectangular parallelepiped structure with an air jet chamber 22 inside, the airflow is ejected from the air jet chamber 22. The cross section of the air jet chamber 22 is a rectangle of which the width is not more than one tenth of the length, and the blown airflow is of a relatively thin "blade shape". Further, the airflow ejected by the air nozzle 2 may be an impulse type airflow, i.e., the air nozzle is turned off immediately after ejecting for a period of time at the beginning of a sample collection process, and eject again after a while. That is, the air nozzle 2 ejects airflow every other same time. The air nozzle 2 may be connected to a pump or an air compressor.

The front cavity 3 has a flared structure and its inner surface is a smooth surface. An upper end of the front cavity 3 is an upper port, and a lower part thereof is a lower port, and a diameter of the upper port is larger than that of the lower port. The upper port allows the airflow ejected by the air nozzle 2 to enter into the front cavity 3. In use, the sample attachment surface 1 to be detected is placed above the front cavity 3, and an axis of the front cavity 3 is kept as perpendicular as possible to the sample attachment surface 1, while the upper port of the front cavity 3 is as close as possible to the sample attachment surface 1 to collect as much airflow as possible. The front cavity 3 is made of inert metal or glass material.

The collecting body 10 has a substantially cylindrical structure, and a top of the collecting body 10 is sealingly connected to the lower end of the front cavity 3. Inside of the collecting body 10 is provided with a cylindrical cavity 5 and a conical cavity 6 arranged vertically coaxially, and bottom thereof is provided with a sample outlet 7 for discharging the sample. An axis of the cylindrical cavity 5 and the conical cavity 6 is a vertical axis. A large end of the conical cavity 6 is in communication with the cylindrical cavity 5, and a small end thereof is communicated to the sample outlet 7, and an axis of the sample outlet 7 also coincides with that of the conical cavity 6.

The collecting body 10 is provided with a plurality of air intake passages 4 for allowing the airflow ejected by the air nozzle 2 into the high cylindrical cavity 5 from the front cavity 3, in the embodiment, regardless of the radial dimension of the air intake passage 4, these air intake passages 4 are non-coplanar with respect to the axis of the cylindrical cavity 5, and arranged inclined downwards and inwards, that is, the axis of the air intake passage 4 in the air intake direction (the direction of the arrow in FIG. 1) is non-coplanar with the axis of the cylindrical chamber 5, and the air intake passage 4 extends obliquely downward and inward, i.e., the angle between the axis of each of the air intake passage 4 and the X-axis, Y-axis and Z-axis is not 0 degree, respectively, so that when the airflow entrained with sample particles enters the cylindrical cavity 5 from the air intake passage 4, it has a tendency of obliquely moving downwards, and the airflow forms a cyclone that rotates downwards after restrained by an inner wall of the cylindrical cavity 5 and the conical cavity 6. The number of the air intake passages 4 may be between 2 and 10 and the air intake passages 4 are arranged in a uniform clockwise or counterclockwise direction. It should be noted that the "upper/above" and "lower/below" in the present disclosure refer to the relative positional relationship of each component, as shown in FIG. 1, the cylindrical chamber 5 is located above the conical chamber 6, and the collecting body 10 is located below the front cavity 3. The "inner/inside/inward" and "outer/outside/outward" in the present disclosure also mean a positional relationship such as an outward direction from the axis of the cylindrical cavity 5 to the wall of the cylindrical cavity 5.

Figure 3:
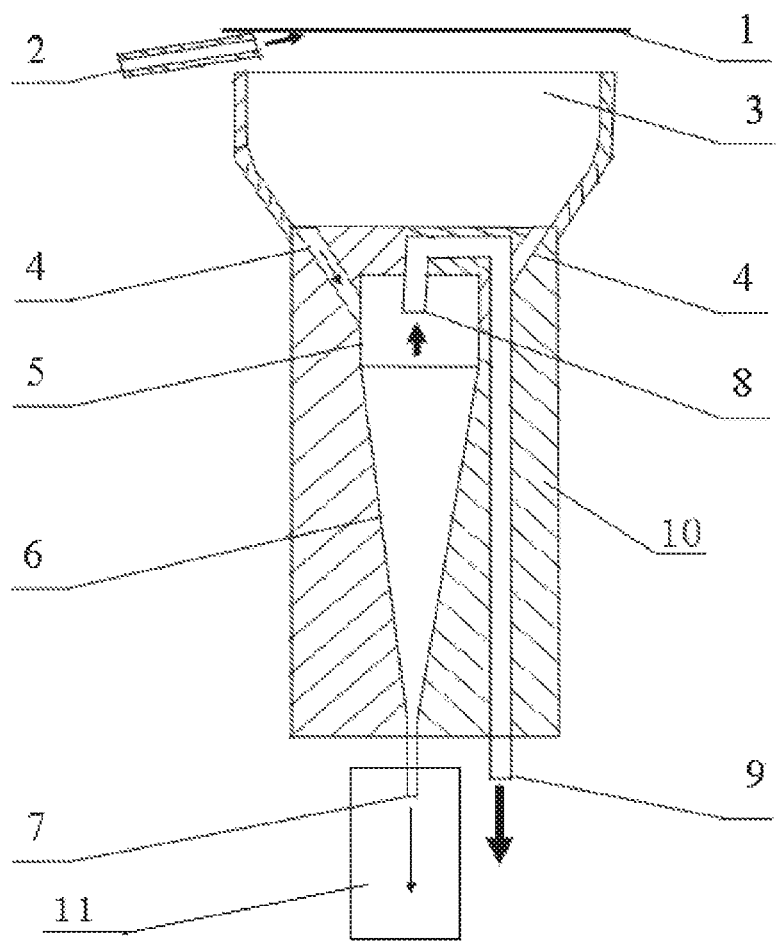
FIG. 3 is a schematic view of a device for collecting semi-volatile or non-volatile substance according to an embodiment of the present disclosure.

During rotation of the cyclone, sample particles may be separated from the cyclone below the conical cavity 6 under the action of centrifugal force and gravity and discharged from the sample outlet 7, and then sample particles may be introduced into the corresponding detection device for detection. As shown in FIG. 3, a filter device 11 may be connected below the sample outlet 7 for allowing sample particles to pass therethrough and for filtering large particle impurities, and the filter device 11 may be made of material such as metal, glass or silica gel.

An air exhaust passage 9 is provided on the collecting body 10. One end of the air exhaust passage 9 is a discharge port 8, and the other end is connected to an air exhaust pump. The discharge port 8 extends downwards from the top of the cylindrical cavity 5 to the inside of the cylindrical cavity 5, and the cyclone inside the conical cavity 6 may be folded back upwards and discharged from the discharge port 8 of the air exhaust passage 9. Since the discharge port 8 extends downwards from the top of the cylindrical cavity 5, the outer wall of the discharge port 8 may form an annular space with the cylindrical cavity 5, which is favorable for guiding the airflow to form a cyclone, thereby improving the separation efficiency, and at the same time, the discharge outlet 8 has a certain distance from the top surface of the cylindrical cavity 5, and it is also possible to avoid the airflow of the air intake passage 4 from being directly discharged from the discharge port 8, and thus avoid a reduction in sampling efficiency.

The total height of the sampling device is 8-10 times a diameter value of the discharge port 8. The air exhaust passage 9 may generate a suction effect in the cylindrical cavity 5 during pumping, so that the airflow in the front cavity 3 may more easily enter the cylindrical cavity 5 and form a cyclone, and thus sample particles are discharged from the sample outlet 7 under the action of gravity and centrifugal force during the rotation. At the same time, as can be seen from FIG. 2, the airflow entering the cylindrical cavity 5 and the conical cavity 6 also forms an internal cyclone with smaller diameter under the suction effect of the discharge port 8 when the airflow is folded back into the discharge port 8, and then is eventually extracted from the air exhaust passage. The diameter of the sample outlet 7 may preferably be 1-1.2 times the diameter of the discharge port 8. The gas flow rate in the air exhaust passage 9 is not smaller than 10 times the gas flow rate discharged from the sample outlet 7.

As can be seen from the above, in the sampling device of the present disclosure, the airflow in the front cavity enters the cylindrical cavity and forms the cyclone, so that sample particles are discharged from the sample outlet under the action of gravity and centrifugal force during a rotating process. In addition, the structure of the sampling device is simple and the cost is low. This device has no moving parts, and thus has low cost. This device is resistant to high pressure (including positive pressure and negative pressure), and the particulate gas entering from the air intake passage may be high pressure gas. Also, the sampling efficiency of the device is high.

The working process of the sampling device is as follows:

First, the sample attachment surface 1 is placed above the device, the front cavity 3 is adjacent to the sample attachment surface 1, and then the air nozzle 2 ejects a "blade-like" airflow to the sample attachment surface 1 to blow sample particles from the sample attachment surface 1 and into the front cavity, then enter the cylindrical cavity 5 through the air intake passage 4 under the suction effect of the suction passage 9 to form a cyclone. During the rotation process, sample particles are discharged from the sampling apparatus through the sample outlet 7 and into the detection device due to gravity and centrifugal force, and another portion of the airflow is discharged from the sampling device through the air exhaust passage 9 with the internal cyclone to complete the sampling process.

In summary, the device for collecting semi-volatile or non-volatile substance provided by the present disclosure has the following advantages:

(1) The device has a simple structure and low cost;

(2) The device has no moving parts and has low cost;

(3) The device is resistant to high pressure (including positive pressure and negative pressure), and the particulate gas entering from the air intake passage may be high pressure gas;

(4) The sampling efficiency of the device is high.

The exemplary embodiments of the present disclosure have been particularly shown and described above. It should be understood that the present disclosure is not limited to the disclosed embodiments, and on the contrary, the present disclosure is intended to cover various modifications and equivalents within the spirit and scope of the appended claims.

What is claimed is:

1. A device for collecting semi-volatile or non-volatile substance, comprising:
   an air nozzle configured to eject air to a sample attachment surface to generate an airflow with sample particles;
   a front cavity in which an upper end has an upper port through which the airflow enters into the front cavity;
   a collecting body sealingly connected to a lower end of the front cavity, inside of which is provided with a cylindrical cavity and a conical cavity arranged coaxially in the vertically direction, and bottom of which is provided with a sample outlet for discharging a sample particle; the sample outlet is connected to the bottom of the conical cavity;
   an air intake passage disposed on the collecting body for allowing the airflow to enter the cylindrical cavity from the front cavity, which is non-coplanar with respect to the axis of the cylindrical cavity, the axis of the cylindrical cavity is a vertical axis, and the air intake passage extends downward and is angled toward the axis of the cylindrical cavity so that the airflow forms a cyclone that rotates downward in the cylindrical cavity; and
   an air exhaust passage disposed on the collecting body, one end of which is a discharge port, and the other end is connected to an air pump, and the discharge port is connected to the interior of the cylindrical cavity,
      wherein a diameter of the sample outlet is 1-1.2 times a diameter of the discharge port.

2. The device for collecting semi-volatile or non-volatile substance according to claim 1, wherein the axis is perpendicular to the sample attachment surface.

3. The device for collecting semi-volatile or non-volatile substance according to claim 1, wherein the conical cavity is a tapered cavity having a large end communicating with the cylindrical cavity and a small end communicating with the sample outlet; the cyclone is folded back upward and then discharged from the discharge port of the air exhaust passage after the cyclone is separated from the sample particles in the conical cavity.

4. The device for collecting semi-volatile or non-volatile substance according to claim 1, wherein the discharge port of the air exhaust passage extends downwards from a top of the cylindrical cavity into the cylindrical cavity.

5. The device for collecting semi-volatile or non-volatile substance according to claim 1, wherein there are a plurality of air intake passages, and the plurality of air intake passages are uniformly arranged in a clockwise direction or a counterclockwise direction.

6. The device for collecting semi-volatile or non-volatile substance according to claim 5, wherein a number of the plurality of air intake passages is 2 to 10.

7. The device for collecting semi-volatile or non-volatile substance according to claim 1, wherein the airflow ejected by the air nozzle is an impulse type airflow.

8. The device for collecting semi-volatile or non-volatile substance according to claim 1, wherein the front cavity is a flared structure, the lower end has a lower port, and the diameter of the upper port is larger than the diameter of the lower port.

9. The device for collecting semi-volatile or non-volatile substance according to claim 1, wherein the front cavity is made of an inert metal or glass material.

10. The device for collecting semi-volatile or non-volatile substance according to claim 1, wherein a gas flow rate in the air exhaust passage is not less than 10 times the gas flow rate at the sample outlet.

11. The device for collecting semi-volatile or non-volatile substance according to claim 1, wherein a filter device for allowing sample particles to pass therethrough and for filtering large particle impurities is connected below the sample outlet.

12. The device for collecting semi-volatile or non-volatile substance according to claim 1, wherein the air nozzle comprises a body having a hollow rectangular parallelpiped structure forming an air chamber.

13. The device for collecting semi-volatile or non-volatile substance according to claim 2, wherein the conical cavity is a tapered cavity having a large end communicating with the cylindrical cavity and a small end communicating with the sample outlet, after the conical cavity separates the cyclone from the sample particles, the cyclone folds back upwards and is discharged from the discharge port of the air exhaust passage.

14. The device for collecting semi-volatile or non-volatile substance according to claim 3, wherein there are a plurality of air intake passages, and the plurality of air intake passages are uniformly arranged in a clockwise direction or a counterclockwise direction.

15. The device for collecting semi-volatile or non-volatile substance according to claim 14, wherein a number of the plurality of intake passages is 2 to 10.

16. The device for collecting semi-volatile or non-volatile substance according to claim 2, wherein the airflow ejected by the air nozzle is an impulse type airflow.

17. The device for collecting semi-volatile or non-volatile substance according to claim 1, wherein the front cavity is a flared structure, the lower end has a lower port, and the diameter of the upper port is larger than the diameter of the lower port.

18. A device for collecting semi-volatile or non-volatile substance, comprising:
- an air nozzle configured to eject air to a sample attachment surface to generate an airflow with sample particles;
- a front cavity in which an upper end has an upper port through which the airflow enters into the front cavity;
- a collecting body sealingly connected to a lower end of the front cavity, inside of which is provided with a cylindrical cavity and a conical cavity arranged coaxially in the vertically direction, and bottom of which is provided with a sample outlet for discharging a sample particle; the sample outlet is connected to the bottom of the conical cavity; and
- an air intake passage disposed on the collecting body for allowing the airflow to enter the cylindrical cavity from the front cavity, which is non-coplanar with respect to the axis of the cylindrical cavity, the axis of the cylindrical cavity is a vertical axis, and the air intake passage extends downward and is angled toward the axis of the cylindrical cavity,
- wherein a gas flow rate in the air exhaust passage is not less than 10 times the gas flow rate at the sample outlet.

* * * * *